United States Patent
Zhang et al.

(10) Patent No.: US 11,160,129 B2
(45) Date of Patent: Oct. 26, 2021

(54) METHODS AND APPARATUS FOR HANDLING OF RADIO LINK FAILURE DETECTION IN HF-NR SYSTEM

(71) Applicant: MediaTek Singapore Pte. Ltd., Singapore (SG)

(72) Inventors: Yuanyuan Zhang, Beijing (CN); Chia-Chun Hsu, New Taipei (TW); Chia-Hao Yu, Yilan (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 25 days.

(21) Appl. No.: 16/319,406

(22) PCT Filed: Aug. 12, 2016

(86) PCT No.: PCT/CN2016/094882
§ 371 (c)(1),
(2) Date: Jan. 21, 2019

(87) PCT Pub. No.: WO2018/027904
PCT Pub. Date: Feb. 15, 2018

(65) Prior Publication Data
US 2019/0335522 A1    Oct. 31, 2019

(51) Int. Cl.
*H04W 76/18*    (2018.01)
*H04W 16/28*    (2009.01)
(Continued)

(52) U.S. Cl.
CPC .......... *H04W 76/18* (2018.02); *H04B 17/318* (2015.01); *H04W 16/28* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

| 8,908,504 | B2  |    | 12/2014 | Barbieri et al. | ...... | H04W 24/00 |
| 9,549,395 | B2  | *  | 1/2017  | Lee             | ........ | H04L 5/001 |

(Continued)

FOREIGN PATENT DOCUMENTS

| CN | 103765954 A | | 7/2011 | | |
| CN | 102143518 A | * | 8/2011 | ............. | H04L 5/006 |

(Continued)

OTHER PUBLICATIONS

International Search Report dated Apr. 20, 2017, issued in application No. PCT/CN2016/094882.
(Continued)

*Primary Examiner* — Peter G Solinsky
*Assistant Examiner* — Sanjay K Dewan
(74) *Attorney, Agent, or Firm* — Helen Mao; Zheng Jin; Imperium Patent Works

(57) ABSTRACT

Apparatus and methods are provided to detect radio link failure in a NR access system. In one novel aspect, the radio link failure is detected upon detection of one or more radio link failure conditions on the serving beam. In one embodiment, the physical layer problem is considered as detected when one or more predefined events occur for a number of consecutive times on the serving beam. In another embodiment, the UE further considers potential recoveries to avoid frequent triggering of the radio link failure condition. In one embodiment, the UE performs the initial alignment procedure to recover the connection. In one embodiment, UE performs the initial alignment procedure without performing radio link recovery on the serving beam. In other embodiments, the UE performs the initial alignment procedure after performing radio link recovery on the serving beam and/or selects one or more beams for initial beam alignment.

21 Claims, 5 Drawing Sheets

(51) Int. Cl.

| | | |
|---|---|---|
| *H04W 76/19* | (2018.01) | |
| *H04W 24/10* | (2009.01) | |
| *H04W 76/27* | (2018.01) | |
| *H04W 72/04* | (2009.01) | |
| *H04W 74/08* | (2009.01) | |
| *H04W 88/06* | (2009.01) | |
| *H04B 17/318* | (2015.01) | |

(52) U.S. Cl.
 CPC ......... *H04W 24/10* (2013.01); *H04W 72/046* (2013.01); *H04W 74/0833* (2013.01); *H04W 76/19* (2018.02); *H04W 76/27* (2018.02); *H04W 88/06* (2013.01)

(58) Field of Classification Search
 USPC .......................................................... 370/329
 See application file for complete search history.

(56) References Cited

U.S. PATENT DOCUMENTS

| | | | | |
|---|---|---|---|---|
| 2009/0109838 A1* | 4/2009 | Kuo | ...................... | H04W 76/18 |
| | | | | 370/216 |
| 2009/0285111 A1* | 11/2009 | Ou | .................... | H04W 72/1284 |
| | | | | 370/252 |
| 2010/0124918 A1* | 5/2010 | Agashe | ........... | H04W 36/00837 |
| | | | | 455/423 |
| 2011/0081904 A1* | 4/2011 | Kuo | ...................... | H04W 76/18 |
| | | | | 455/425 |
| 2011/0110227 A1* | 5/2011 | Yang | .................... | H04W 72/085 |
| | | | | 370/228 |
| 2013/0083675 A1* | 4/2013 | Yamada | ................. | H04W 24/08 |
| | | | | 370/252 |
| 2013/0155847 A1* | 6/2013 | Li | ........................ | H04W 24/04 |
| | | | | 370/225 |
| 2014/0233396 A1* | 8/2014 | Marinier | ............... | H04W 72/02 |
| | | | | 370/242 |
| 2014/0328162 A1* | 11/2014 | Jeong | .................... | H04W 24/10 |
| | | | | 370/221 |
| 2015/0016318 A1* | 1/2015 | Lee | ........................... | H04L 5/14 |
| | | | | 370/280 |
| 2015/0230263 A1* | 8/2015 | Roy | ....................... | H04W 16/28 |
| | | | | 455/452.2 |
| 2015/0373675 A1* | 12/2015 | Seo | ...................... | H04W 72/042 |
| | | | | 370/280 |
| 2016/0353510 A1* | 12/2016 | Zhang | ...................... | H04L 43/16 |
| 2018/0278357 A1* | 9/2018 | Kim | ...................... | H04J 11/0076 |
| 2018/0279403 A1 | 9/2018 | Kim | | H04W 76/19 |
| 2019/0036590 A1* | 1/2019 | Nagaraja | ............... | H04W 76/19 |
| 2019/0037635 A1* | 1/2019 | Guo | ...................... | H04W 76/19 |
| 2019/0053315 A1* | 2/2019 | Yiu | ...................... | H04L 1/189 |
| 2019/0081689 A1* | 3/2019 | Yu | ...................... | H04W 74/0833 |
| 2019/0089447 A1* | 3/2019 | Sang | ...................... | H04W 40/36 |
| 2019/0104549 A1* | 4/2019 | Deng | .................. | H04B 7/0617 |
| 2019/0150009 A1* | 5/2019 | Zhang | .................... | H04B 7/088 |
| | | | | 370/252 |
| 2019/0174346 A1* | 6/2019 | Murray | ............... | H04W 72/046 |
| 2019/0200248 A1* | 6/2019 | Basu Mallick | ...... | H04B 7/0695 |
| 2019/0200249 A1* | 6/2019 | Yoon | ...................... | H04L 5/0023 |
| 2019/0207667 A1* | 7/2019 | Zhou | .................... | H04B 7/0626 |
| 2019/0215048 A1* | 7/2019 | Cirik | ...................... | H04B 7/088 |
| 2019/0335522 A1* | 10/2019 | Zhang | ................. | H04W 74/0833 |
| 2019/0357292 A1* | 11/2019 | Cirik | ...................... | H04W 76/19 |
| 2020/0028545 A1* | 1/2020 | Koskela | ............... | H04W 76/19 |
| 2020/0067589 A1* | 2/2020 | Jeong | .................... | H04W 24/10 |
| 2020/0288359 A1* | 9/2020 | Kim | .................... | H04W 24/10 |
| 2021/0051755 A1* | 2/2021 | Bao | ........................ | H04W 76/19 |

FOREIGN PATENT DOCUMENTS

| | | | | |
|---|---|---|---|---|
| CN | 102143518 A | 8/2011 | | |
| CN | 105052199 A | 8/2012 | | |
| CN | 105519167 A | 7/2013 | | |
| CN | 104519506 A | 9/2013 | | |
| CN | 104115419 A | * | 10/2014 | ............... H04L 1/20 |
| CN | 104115419 A | 10/2014 | | |
| WO | WO 02010105148 A1 | 3/2009 | | |

OTHER PUBLICATIONS

Chinese Patent Office, First Examination Written Opinion for application 201680050648.7, dated Mar. 24, 2021 (6 pages).

* cited by examiner

METHODS AND APPARATUS FOR HANDLING OF RADIO LINK FAILURE DETECTION IN HF-NR SYSTEM

TECHNICAL FIELD

The disclosed embodiments relate generally to wireless communication, and, more particularly, to radio link failure detection in the new radio access system.

BACKGROUND 5G radio access technology will be a key component of the modern access network. It will address high traffic growth and increasing demand for high-bandwidth connectivity. It will also support massive numbers of connected devices and meet the real-time, high-reliability communication needs of mission-critical applications. Both the standalone NR deployment and non-standalone NR with LTE/eLTE deployment will be considered. For example, the incredible growing demand for cellular data inspired the interest in high frequency (HF) communication system. One of the objectives is to support frequency ranges up to 100 GHz. The available spectrum of HF band is 200 times greater than conventional cellular system. The very small wavelengths of HF enable large number of miniaturized antennas to be placed in small area. The miniaturized antenna system can form very high very high gain, electrically steerable arrays and generate high directional transmissions through beamforming.

Beamforming is a key enabling technology to compensate the propagation loss through high antenna gain. The reliance on high directional transmissions and its vulnerability to the propagation environment will introduce particular challenges including intermittent connectivity and rapidly adaptable communication. HF communication will depend extensively on adaptive beamforming at a scale that far exceeds current cellular system. High reliance on directional transmission such as for synchronization and broadcast signals may delay the base station detection during cell search for initial connection setup and handover, since both the base station and the mobile stations need to scan over a range of angles before a base station can be detected. HF signals are extremely susceptible to shadowing due to the appearance of obstacles such as human body and outdoor materials. Therefore, signal outage due to shadowing is a larger bottleneck in delivering uniform capacity. For HF-NR with beam operation, multiple beams cover the cell. UE needs to consider the multiple beams from the network side for downlink quality detection. UE needs to utilize the collective measurement results of different beams to represent the radio link quality of the serving cell.

Improvements and enhancements are required for detection of radio link failure in the new radio (NR) access system/network.

SUMMARY

Apparatus and methods are provided to detect radio link failure in a NR access system. In one novel aspect, the physical layer problem is detected upon detection of one or more problem conditions on the serving beam. In one embodiment, the physical layer problem is considered as detected when one or more problem detection conditions events occur for a number of consecutive times on the serving beam.

In another embodiment, the UE further considers potential recoveries to avoid frequent triggering of the radio link failure condition. In one embodiment, the radio link is considered as recovered when one or more predefined recovery events occur for a number of consecutive times on the serving beam.

In another novel aspect, the UE performs one or more recovery procedures supervised by a timer or a count number. In one embodiment, the UE performs the initial alignment procedure to recover the connection. In one embodiment, UE performs radio link recovery procedure on the serving beam. In one embodiment, UE performs the initial alignment procedure after performing radio link recovery on the serving beam.

In one embodiment, the initial beam alignment procedure uses the dedicated resource if it is available. If no dedicated resource is available, the UE performs the initial alignment procedure using the random access (RA) procedure. In one embodiment, the UE performs the initial alignment procedure using the random access (RA) procedure.

In yet another embodiment, a beam-alignment timer is used to supervise the initial beam alignment procedure. If the beam-alignment timer expires and the UE cannot acquire a good beam of a serving cell, the UE terminates the initial beam alignment procedure and sends the radio link failure indication to the upper layer.

In another embodiment, the UE selects one or more beams for initial beam alignment; each satisfies one or more predefined criterion.

In another embodiment, UE skips one or more recovery procedures when one or more skip conditions occur.

In another novel aspect, An user equipment (UE) is provided, comprising: a transceiver that transmits and receives HF wave signals from one or more HF base stations; a beam tracker that determines a beam used for data transmission among a set of beams and detects the physical layer problem on the beam, wherein the beam is considered as serving beam, and the set of beams are considered as candidate beams; a recovery module that performs one or more recovery procedures by a timer or a count number; and a failure handler that declares a radio link failure concluding a failure of the one or more recovery procedures.

In one embodiment, the physical problem on the serving beam is detected if one or more problem detection conditions occurred within a predefined period, and the physical layer problem detection condition is that one Qout is generated reusing RLM procedure measuring the serving beam, the recovery procedure is a recovery detection procedure performed on the serving beam, or the recovery procedure is a beam alignment procedure that the UE acquires a second beam of a serving cell for data transmission.

In another embodiment, the UE further comprises a beam selector, for selecting one or more best beams for beam alignment, wherein the beams are selected from the candidate beams.

In yet another embodiment, the recovery module performs one or multiple recovery procedures, wherein the recovery detection procedure on the serving beam is performed first and then the beam alignment procedure is performed if radio link of the serving beam is not recovered.

In another embodiment, the recovery module skips the recovery procedures if one or more skip conditions occur. And a radio link failure is declared by the failure handler, if the recovery procedure fails and a radio resource control (RRC) connection reestablishment procedure is triggered.

BRIEF DESCRIPTION OF THE DRAWINGS

The accompanying drawings, where like numerals indicate like components, illustrate embodiments of the invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections. The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure. Some variations of the embodiments are described. Throughout the various views and illustrative embodiments, like reference numbers are used to designate like elements. Reference will now be made in detail to some embodiments of the invention, examples of which are illustrated in the accompanying drawings.

Reference will now be made in detail to some embodiments of the invention, examples of which are illustrated in the accompanying drawings.

Figure 1:
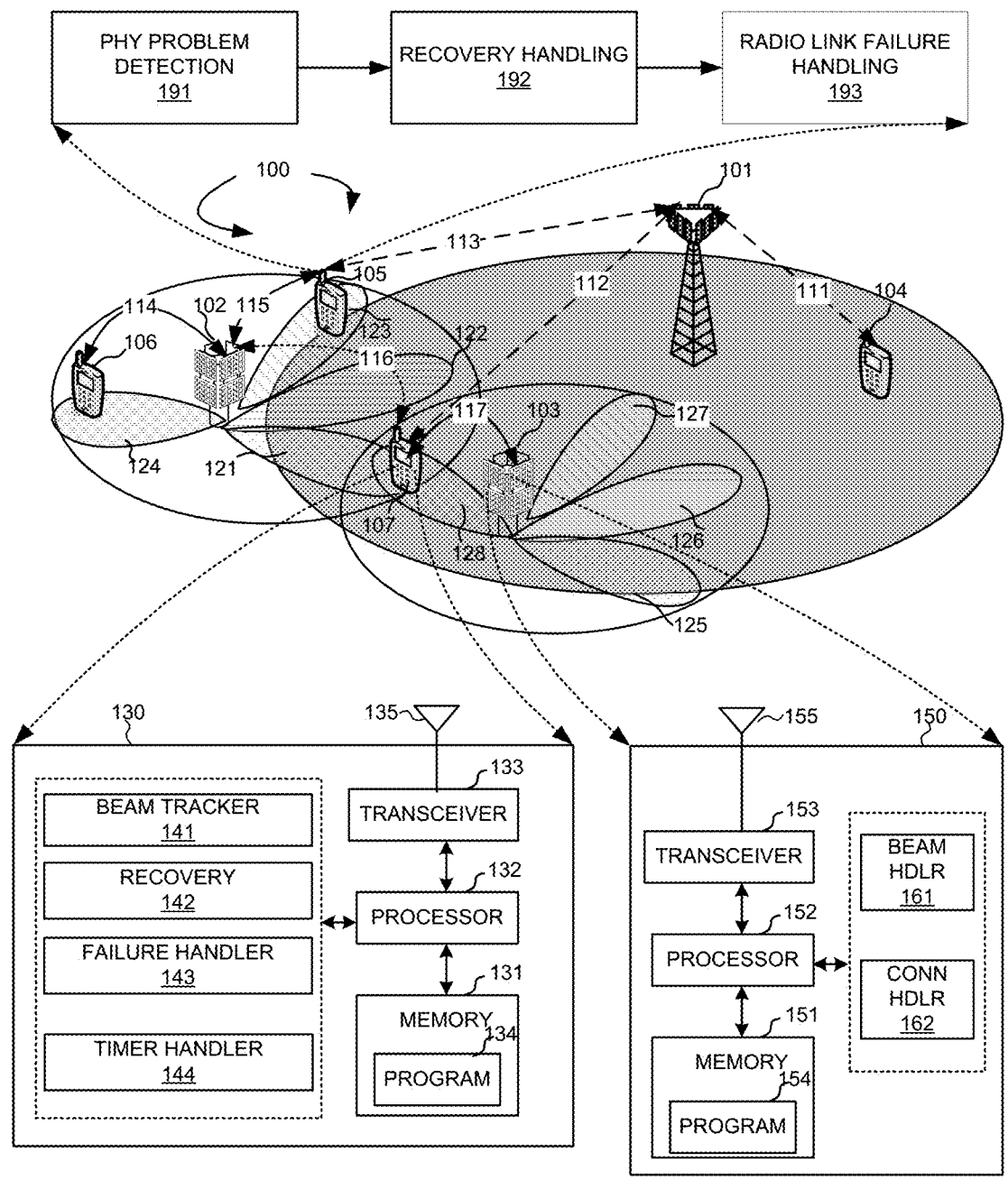
FIG. 1 is a schematic system diagram illustrating an exemplary wireless network with HF connections in accordance with embodiments of the current invention.

FIG. 1 is a schematic system diagram illustrating an exemplary wireless network 100 with HF connections in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve a number of mobile stations 104, 105, 106 and 107 within a serving area, for example, a cell, or within a cell sector. In some systems, one or more base stations are coupled to a controller forming an access network that is coupled to one or more core networks. eNB 101 is a conventional base station served as a macro eNB. eNB 102 and eNB 103 are HF base station, the serving area of which may overlap with serving area of eNB 101, as well as may overlap with each other at the edge. HF eNB 102 and HF eNB 103 has multiple sectors each with multiple beams to cover a directional area. Beams 121, 122, 123 and 124 are exemplary beams of eNB 102. Beams 125, 126, 127 and 128 are exemplary beams of eNB 103. The coverage of HF eNB 102 and 103 can be scalable based on the number of TRPs radiate the different beams. As an example, UE or mobile station 104 is only in the service area of eNB 101 and connected with eNB 101 via a link 111. UE 106 is connected with HF network only, which is covered by beam 124 of eNB 102 and is connected with eNB 102 via a link 114. UE 105 is in the overlapping service area of eNB 101 and eNB 102. In one embodiment, UE 105 is configured with dual connectivity and can be connected with eNB 101 via a link 113 and eNB 102 via a link 115 simultaneously. UE 107 is in the service areas of eNB 101, eNB 102, and eNB 103. In embodiment, UE 107 is configured with dual connectivity and can be connected with eNB 101 with a link 112 and eNB 103 with a link 117. In embodiment, UE 107 can switch to a link 116 connecting to eNB 102 upon connection failure with eNB 103.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver module 133 is an example, and in one embodiment, the RF transceiver module comprises two RF modules (not shown), first RF module is used for HF transmitting and receiving, and another RF module is used for different frequency bands transmitting and receiving which is different from the HF transceiving. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107. Mobile station 107 also includes multiple function modules that carry out different tasks in accordance with embodiments of the current invention. A beam tracker 141 determines a beam. It is used for data transmission directly, or is used as anchor beam, associated with which finer resolution beams are used for data transmission. The beam tracker selects the serving beam for data transmission among a set of beams and detects the physical layer problem on the beam, wherein the beam is considered as serving beam, and the set of beams are considered as candidate beams. A recovery module 142 performs one or more recovery procedures. A failure handler 143 declares radio link failure concluding a failure of the one or more recovery procedures. In one embodiment, UE 107 comprises Timer handler module 144, for processing the timers in the beam tracking, recovery, radio link failure detection, etc.

Similarly, eNB 103 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. A beam handler 161 handles beam management procedures. A connection module 162 handles connection and reconnection requests from the UE.

FIG. 1 further shows functional procedures that handle radio link detection in HF system. UE 105 has a physical layer problem procedure 191 on the serving cell, a link recovery procedure 192, and a radio link failure handling procedure 193.

In one novel aspect, physical layer problem procedure 191 monitors and determines physical layer problem based on one or more problem detection conditions. The physical layer problem is detected if the link quality of the serving beam is too bad to maintain connectivity for an evaluation period. In one embodiment, the physical layer problem is considered as detected when one or more problem detection events occur for a predefined number of consecutive times. For example, a problem detection event is one generated Qout reusing current radio link monitoring procedure based on the measurement on the serving beam.

In another novel aspect, physical layer problem detection procedure 191 further considers potential recoveries to avoid frequent triggering of the beam-tracking failure condition. In one embodiment, the beam tracking is considered as recovered when one or more predefined recovery events occur for a predefined number of consecutive times. One generated Qin reusing current radio link monitoring procedure.

In one novel aspect, recovery handling procedure 192 performs recovery procedures before declaring radio link failure. In one embodiment, a recovery timer is used to supervise the procedure. The recovery timer is started when the physical problem is detected on the serving beam. Upon starting the recovery timer, the UE starts one or more recovery procedures.

In one embodiment, recovery detection procedure on the serving beam is performed to recover the radio link. The serving beam is recovered if one or more recovery condition occurred within a predefined period. For example, a recovery detection event is one generated Qin reusing current radio link monitoring procedure based on the measurement on the serving beam.

In one embodiment, a recovery timer is used to supervise the recovery detection procedure on the serving beam. The recovery timer is started when the physical problem is detected on the serving beam. Upon starting the recovery timer, UE starts recovery detection procedure on the serving beam. The recovery timer is stopped if the serving beam is recovered. The UE begins communication with the base station through the serving beam and continues monitoring to determine if physical layer problem is detected. If the serving beam is not recovered, the UE declares radio link failure.

In one embodiment, the initial beam alignment procedure is performed to recover the link. The initial beam alignment is performed within the serving cell of the UE to acquire another beam of the serving cell for communication. The initial beam alignment procedure sets the initial establishment of beamforming parameters at both the base station and the UE for subsequent communication. A beam searching is performed based on reference signal (RS) transmission. The RS can be a downlink (DL) RS or an uplink (UL) RS. The DL reference signal needs a UL feedback channel to indicate reception situation. This implementation is beneficial for the UE power consumption and can be used for multi-user training by same transmissions. The UL reference signal option is less UE power friendly. The UL RS option reduces training latency when the UE is equipped with multiple transceiver chains.

In one embodiment, a recovery timer is used to supervise the initial alignment procedure. The recovery timer is started when the physical problem is detected on the serving beam. Upon starting the recovery timer, UE starts the initial alignment procedure. The recovery timer is stopped if one beam of the serving cell is acquired. The UE begins communication with the base station through the new beam and continues monitoring to determine if physical layer problem is detected. If no beam acquired when the recovery timer expired, the UE declares radio link failure.

In one embodiment, UE performs one or more recovery procedures before declaring radio link failure. For example, UE performs the recovery detection procedure on the serving beam. The first recovery timer is started when the physical problem is detected on the serving beam. Upon starting the recovery timer, UE starts recovery detection procedure on the serving beam. The recovery timer is stopped if the serving beam is recovered. The UE begins communication with the base station through the serving beam and continues monitoring to determine if physical layer problem is detected. If the serving beam is not recovered until the expiry of the first recovery timer, the UE performs the initial alignment procedure. The second recovery timer is used to supervise the initial alignment procedure. Upon starting the recovery timer, UE starts the initial alignment procedure. The recovery timer is stopped if one beam of the serving cell is acquired. The UE begins communication with the base station through the new beam and continues monitoring to determine if physical layer problem is detected. If no beam acquired when the recovery timer expired, the UE declares radio link failure.

In another embodiment, the initial beam alignment procedure used the dedicated resource if dedicated resource is available. The base station response is required if dedicated resource is used. The base station response can be scheduling information granted or assigned to the UE. The base station response can also be a MAC control element (CE). If there is no dedicated resource is available, the initial beam alignment procedure uses the random access process. Dedicated resource takes precedence over the random access process.

In another embodiment, the initial beam alignment procedure uses the random access procedure.

In one novel aspect, radio link failure handling procedure 193 declares radio link failure and perform reestablishment of a new connection. In one embodiment, the UE is connected with a standalone HF system. The radio link failure is a trigger event for the RRC connection re-establishment.

Figure 2:
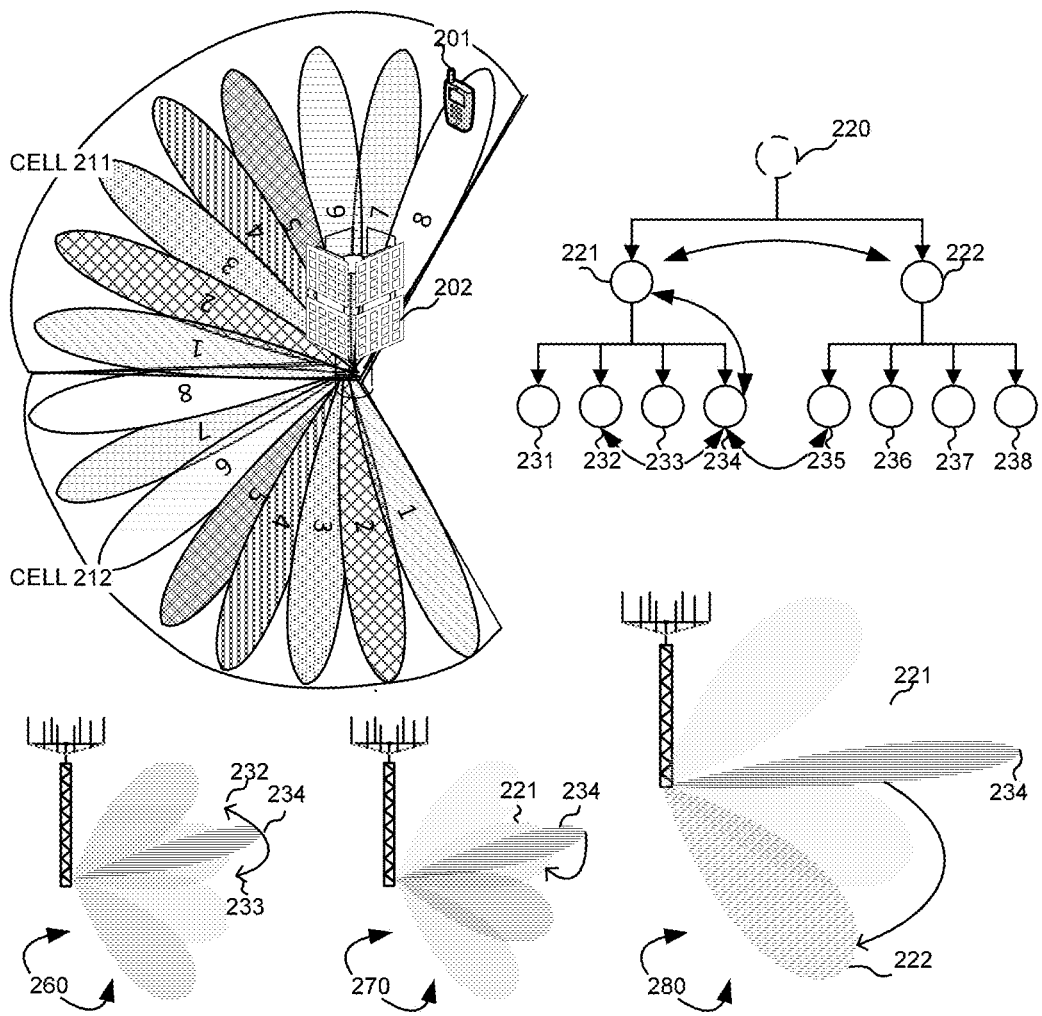
FIG. 2 illustrates an exemplary HF wireless system with multiple control beams and dedicated beams in multiple directionally configured cells.

FIG. 2 illustrates an exemplary HF wireless system with multiple control beams and dedicated beams in multiple directionally configured cells. A UE 201 is connected with an HF eNB 202. HF eNB 202 is directionally configured with multiple sectors/cells. Each sector/cell is covered by a set of coarse TX control beams. As an example, cells 211 and 212 are configured cells for HF eNB 202. In one example, three sectors/cells are configured, each covering a 1200 sector. In one embodiment, each cell is covered by eight control beams. Different control beams are time division multiplexed (TDM) and distinguishable. Phased array antenna is used to provide a moderate beamforming gain.

The set of control beams is transmitted repeatedly and periodically. Each control beam broadcasts the cell-specific information such as synchronization signal, system information, and beam-specific information. Besides coarse TX control beams, there are multiple dedicated beams, which are finer-resolution BS beams.

Beam tracking is an important function for the HF mobile stations. Multiple beams, including coarse control beams and dedicated beams are configured for each of the directionally configured cells. The UE monitors the qualities of its neighboring beams by beam tracking. FIG. 2 illustrates exemplary beam tracking/switching scenarios. A cell 220 has two control beams 221 and 222. Dedicated beams 231, 232, 233 and 234 are associated with control beam 221. Dedicated beams 235, 236, 237 and 238 are associated with control beam 222. In one embodiment, the UE connected via beam 234, monitors its neighboring beams for dedicated beam 234. Upon a beam-switching decision, the UE can switch from dedicated beam 234 to beam 232 and vice versa. In another embodiment, the UE can fall back to control beam 221 from dedicated beam 234. In yet another embodiment, the UE also monitors dedicated beam 235 configured for control beam 222. The UE can switch to dedicated beam 235, which belongs to another control beam.

FIG. 2 also illustrates three exemplary beam-switching scenarios 260, 270 and 280. UE 201 monitors neighboring beams. The sweeping frequency depends on the UE mobility. The UE detects dropping quality of the current beam when the current beam quality degrades by comparing with coarse resolution beam quality. The degradation may be caused by tracking failure, or the channel provided by refined beam is merely comparable to the multipath-richer channel provided by the coarse beam. Scenario 260 illustrates the UE connected with 234 monitors its neighboring dedicated beams 232 and 233, which are all associated to its control beam, i.e. control beam 221. The control beam 221 is the serving beam, which is used as the anchor beam for data transmission over dedicated beam 234. The UE can switch to dedicated beam 232 or 233. Scenario 270 illustrates the UE connected with 234 can fall back to the control beam 221. Scenario 280 illustrates the UE connected with 234 associated with control beam 221 can switch to another control beam 222. The control beam 222 is the serving beam, which is used for data transmission directly.

Figure 3:
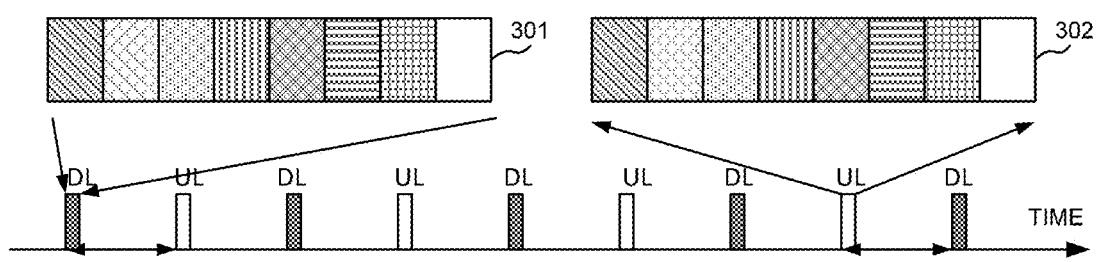
FIG. 3 illustrates an exemplary beam configuration for UL and DL of the UE in accordance with the current invention.

FIG. 3 illustrates an exemplary beam configuration for UL and DL of the UE in accordance with the current invention. A beam is a combination of downlink and uplink resources. The linking between the beam of the DL resource and the beam of the UL resources is indicated explicitly in the system information or beam-specific information. It can also be derived implicitly based on some rules, such as the interval between DL and UL transmission opportunities. In one embodiment, A DL frame 301 has eight DL beams occupying a total of 0.38 msec. A UL frame 302 has eight UL beams occupying a total of 0.38 msec. The interval between the UL frame and the DL frame is 2.5 msec.

Figure 4:
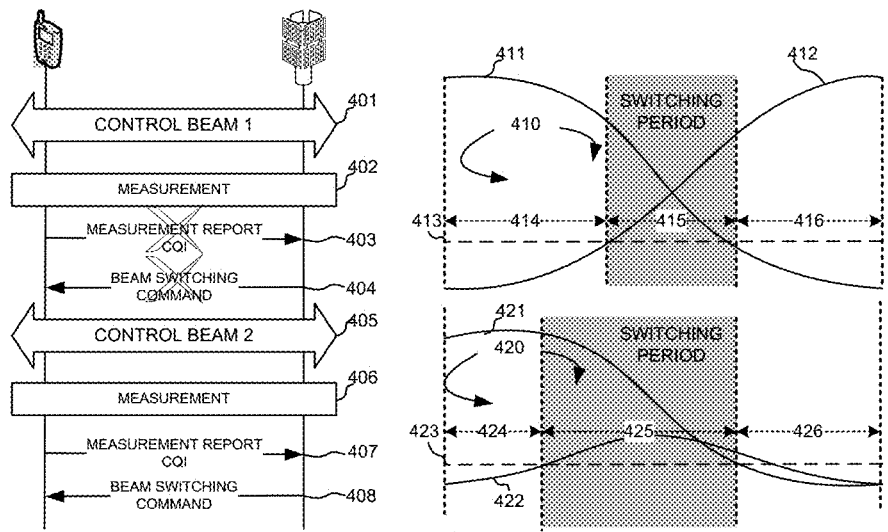
FIG. 4 illustrates exemplary flow chart and diagram of the beam-switching procedure in accordance with embodiments of the current invention.

FIG. 4 illustrates exemplary flow chart and diagram of the beam-switching procedure in accordance with embodiments of the current invention. A UE is connected with an mmW eNB. At step 401, the UE is connected with the eNB via beam #1. At step 402, the UE monitors and measures link qualities. At step 403, the UE sends measurement report/CQI to the eNB. If the measurement report is received successfully, the eNB replies with a beam-switching command at step 404. In an mmW system, step 403 or step 404 may fail due to the fast fluctuation of the channel quality of mmW and rapidly adaptive beam tracking. Therefore, the data transmission or reception through the current beam will be interrupted until another beam is successfully acquired. When the UE receives the beam-switching command at step 404, the UE may switch to beam #2 at step 405. Subsequently, at step 406, the UE starts performing measurement based on the new beam. At step 407, the UE sends measurement report/CQI to the eNB. At step 408, the eNB sends a beam-switching command to the UE if the current beam degrades.

FIG. 4 further illustrates an exemplary switching period for the beam-switching procedure. In scenario 410, two beams 411 and 412 have different signal strength/quality varying by time. A signal strength/quality threshold 413 is configured for the UE. If the signal strength/quality of the UE went below threshold 413, the beam-switching procedure should be initiated. During period 414, the signal strength/quality of beam 412 is below threshold 413. The beam switching procedure should not be performed during this period because switching to beam 412 may fail due to the low signal strength of beam 412. During period 415, the UE initiates the beam-switching procedure. Period 415 is also called the switching period. During this period, both beam 411 and beam 412 are above threshold 413. As signal quality of 411 continues going down while the signal quality of 412 continues going up, the UE can successfully switch to beam 412 with a better quality. During period 416, signal quality of 411 drops to below threshold 413. The beam switching following the process in FIG. 4 may fail because the UE may not be able to receive successfully the beam-switching command due to its low signal strength. In one embodiment, the UE performs beam switching during the switching period based on predefined criterion, such as threshold 413.

In scenario 420, two beams 421 and 422 have different signal strength/quality varying by time. A signal strength/quality threshold 423 is configured for the UE. During period 424, the signal strength/quality of beam 422 is below threshold 423. The beam switching procedure should not be performed during this period because switching to beam 422 may fail due to the low signal strength of beam 422. During period 425, the UE can initiate the beam-switching process. Period 425 is also called the switching period. During this period, both beam 421 and beam 422 are above threshold 423. As signal quality of 411 continues going down while the signal quality of 412 continues going up, the UE can successfully switch to beam 412 with a better quality. In scenario 420, though, the beam switching between beams 421 and 422 eventual fails because during period 426, both control 421 and 422 may have signal strengths below threshold 423. Therefore, even if the UE successfully performed the beam switching, it may lost connection to both beams during period 426. Additional beam handling procedures are needed.

Figure 5:
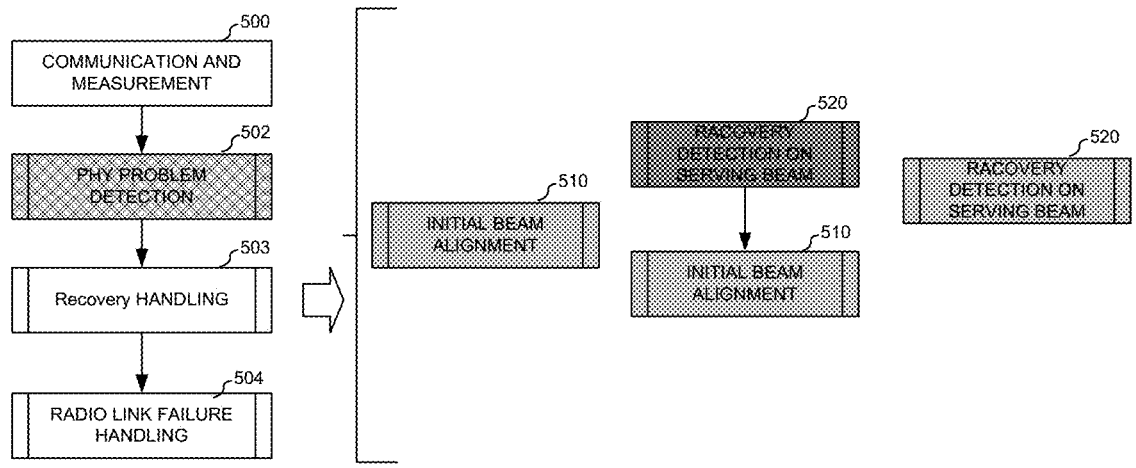
FIG. 5 illustrates exemplary procedures of detecting radio link failure with different optional procedures in accordance with embodiments of the current invention.

FIG. 5 illustrates exemplary procedures of radio link failure detection with different optional procedures in accordance with embodiments of the current invention. At step 500, the UE measures communication quality and communicates the measurement results to the eNB. At step 502, the UE performs PHY problem detection. When a PHY problem is detected, the UE performs one ore more recovery procedures at step 503. At step 504, radio link failure is declared and handled.

In one embodiment, recovery handling performs one or more different recovery procedure. In one embodiment, a step 510 is performed after step 502. At step 510, an initial beam alignment procedure is performed such that the link can be recovered. If step 510 succeed, the UE goes back to step 502. In another embodiment, an additional step 520 is performed before the initial beam alignment procedure. At step 520, recovery detection on the serving beam is performed to try to recover the original connection. If step 520 succeeded, the UE goes back to step 502 and continue monitoring the connection on the serving beam. If step 520 failed, the UE moves to step 510 to perform the initial beam alignment procedure. In another embodiment, a step 520 is performed after step 502. At step 520, recovery detection on the serving beam is performed to try to recover the original connection. If step 510 succeed, the UE goes back to step 502.

Figure 6:
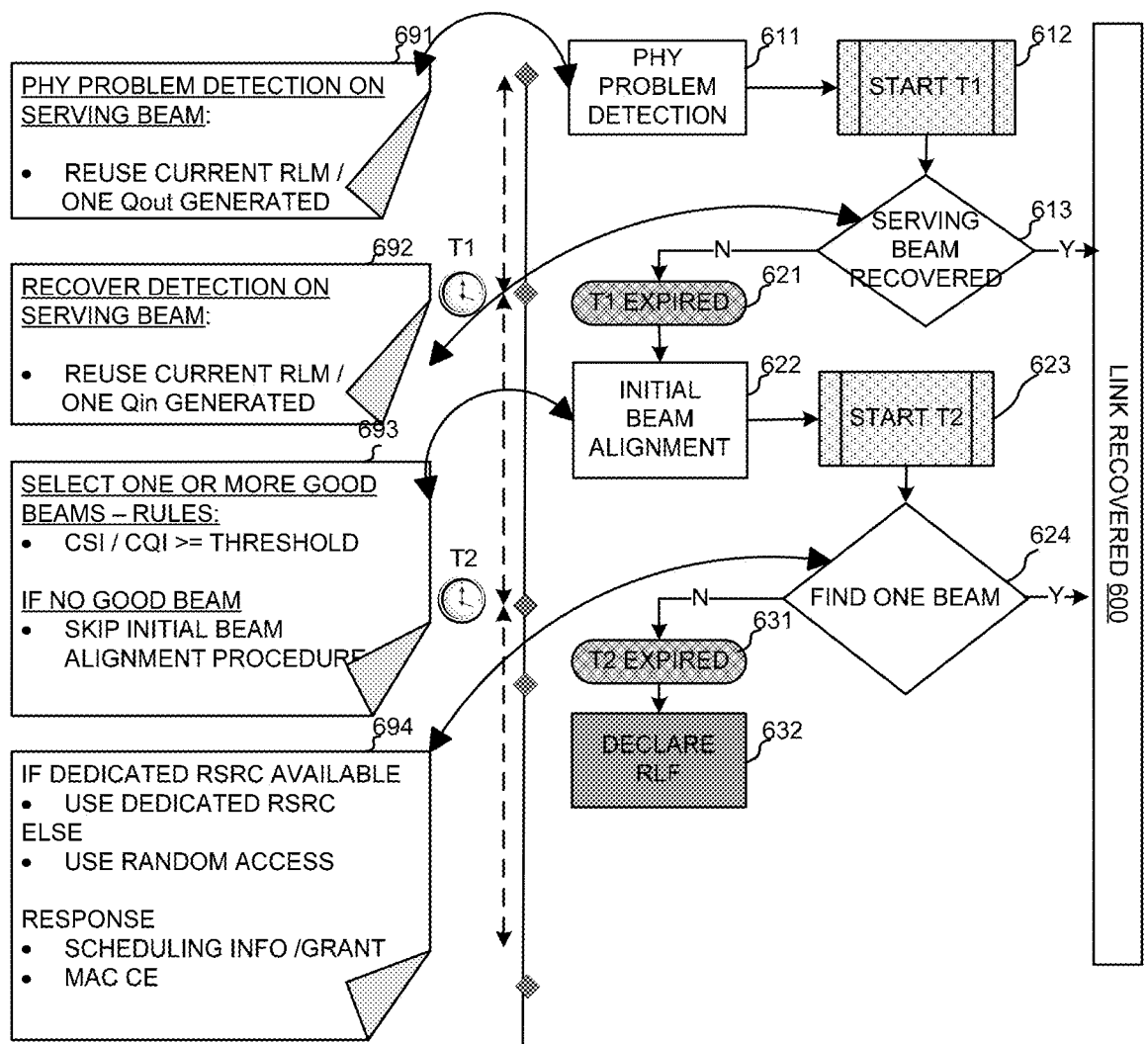
FIG. 6 shows an exemplary diagram of the timer-based recovery procedure in accordance with embodiments of the current invention.

In one novel aspect, one or more recovery timers are used to supervise the one or more recovery procedures. FIG. 6 shows an exemplary diagram of the timer-based recovery procedure in accordance with embodiments of the current invention. At step 611, one or more PHY layer problem conditions are detected. In one embodiment, a predefined problem condition in 691 is one Qout is generated reusing of current radio link management (RLM) procedure based on the measurement on the serving beam. At step 612, upon detecting the PHY layer problem, the UE starts T1 timer. If at step 613, the UE determines that the serving beam is recovered, the UE moves to a step 600, which puts the UE in the link-recovered state. At step 621, T1 timer expired and the serving beam is not recovered. The serving beam is determined to be recovered by detecting one or more recovery conditions 692. In one embodiment, a recovery condition in 692 is one Qin generated reusing of current radio link management (RLM) procedure based on the measurement on the serving beam. In one embodiment, the UE moves to step 622 to perform another recovery procedure through UE initial beam alignment with an additional period. At step 623, the UE starts T2 timer. Rules 693 is used for the initial beam alignment procedure. In one embodiment, the UE selects one or more good beams based on good-beam rules, such as CSI/CQI greater than or equal to a predefined threshold. If there is no good beam found according to the rule, the UE will skip the initial beam alignment procedure. In one embodiment, as 694 the UE uses the dedicated resource if it is available. If there is no dedicated resource, the UE uses the random access procedure. When responses from base stations are required, the response can be carried in either scheduling information/grant or MAC CE. In one embodiment, UE can use the random access procedure directly for initial beam alignment. If at step 624, one beam is found the UE moves step 600, which puts the UE in the link-recovered state. At step 631, T2 timer expired and no beam is found. The UE moves to step 632 and declares radio link failure.

Figure 7:
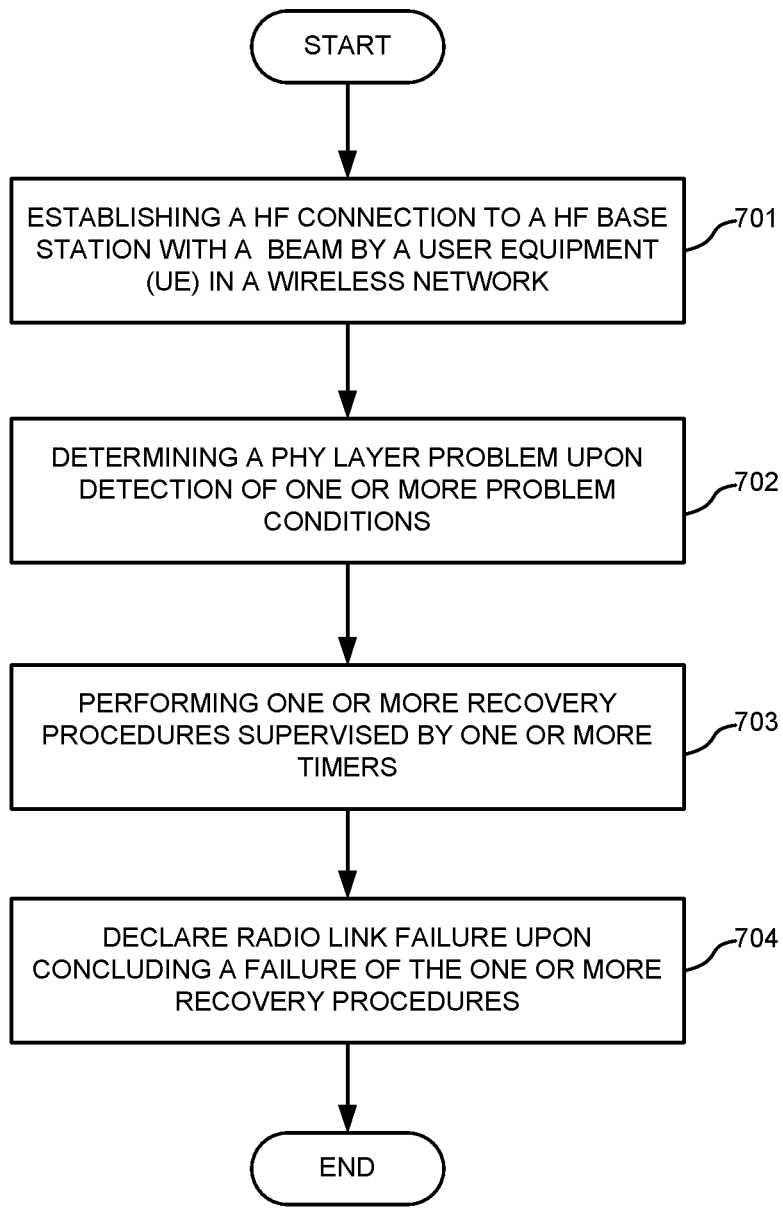
FIG. 7 shows an exemplary flow chart for the detection of radio link failure in the HF wireless system in accordance with embodiments of the current invention.

FIG. 7 shows an exemplary flow chart for the handling of radio link failure detection in the HF wireless system in accordance with embodiments of the current invention. At step 701, the UE establishes a HF connection to an HF base station with a beam in a wireless network. At step 702, the UE detects physical problem upon detection of one or more problem conditions. At step 703, the UE performs one or more recovery procedures based on one or more recovery conditions. At step 704, the UE declares radio link failure upon concluding a failure of the one or more recovery procedures.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
performing data transmission with a high frequency (HF) base station through multibeam operation by a user equipment (UE), which selects a beam among a set of beams, wherein the beam is considered as serving beam and the set of beams are considered as candidate beams;
determining a physical layer problem upon detection of one or more problem detection conditions on the beam;
performing a plurality of recovery procedures before a radio link failure (RLF) is declared, wherein the plurality of recovery procedures comprising a recovery of the serving beam and an initial beam alignment of the candidate beams; and
declaring the RLF upon concluding the plurality of recovery procedures all failed.

2. The method of claim 1, wherein candidate beams satisfy certain conditions, which comprising: a measured signal strength or quality is higher than a predefined threshold; channel status or channel quality are measured and reported to a network; an element of the candidate lists configured by the network.

3. The method of claim 1, wherein physical layer problem is detected when the problem detection condition occurs for a number of consecutive times, and the problem detection condition comprising: one Qout is generated reusing radio link monitoring (RLM) procedure measuring the serving beam.

4. The method of claim 1, wherein the recovery procedure is a recovery detection procedure performed on the serving beam.

5. The method of claim 4, wherein the serving beam is recovered when one or more recovery condition occurred within a predefined period, and the recovery condition is that one Qin is generated reusing RLM procedure.

6. The method of claim 1, wherein the recovery procedure is a beam alignment procedure that the UE acquires a second beam of a serving cell for data transmission.

7. The method of claim 6, wherein using a dedicated resource for the beam alignment procedure when dedicated resources are available, and using a random access (RA) for the beam alignment procedure when dedicated resources are not available.

8. The method of claim 6, wherein using a random access (RA) for the beam alignment procedure.

9. The method of claim 6 further comprising: selecting one or more best beams for the beam alignment procedure, wherein the one or more best beams are selected from the candidate beams.

10. The method of claim 1, further comprising performing one or multiple recovery procedures, wherein the recovery detection procedure on the serving beam is performed first and then the beam alignment procedure is performed when radio link of the serving beam is not recovered.

11. The method of claim 1, further comprising: skipping the recovery procedures when one or more skip conditions occur.

12. The method of claim 11, wherein the skip conditions comprising: measured signal strength or quality of all beams are lower than a predefined threshold; channel status or channel quality of all beam are lower than a predefined threshold; recovery procedure is disabled by the network.

13. The method of claim 1, wherein radio link failure is declared when the recovery procedure fails and a radio resource control (RRC) connection reestablishment procedure is triggered.

14. A user equipment (UE), comprising:
a transceiver that transmits and receives high frequency (HF) wave signals from one or more HF base stations;
a beam tracker that determines a beam used for data transmission among a set of beams and detects the physical layer problem on the beam, wherein the beam is considered as serving beam, and the set of beams are considered as candidate beams;
a recovery module that performs a plurality of recovery procedures before a radio link failure (RLF) is declared, wherein the plurality of recovery procedures comprising a recovery of the serving beam and an initial beam alignment of the candidate beams; and
a failure handler that declares the RLF upon concluding the plurality of recovery procedures all failed.

15. The UE of claim 14, wherein the physical problem on the serving beam is detected when one or more problem detection conditions occurred within a predefined period, and the physical layer problem detection condition is that one Qout is generated reusing RLM procedure measuring the serving beam.

16. The UE of claim 14, wherein the recovery procedure is a recovery detection procedure performed on the serving beam.

17. The UE of claim 14, wherein the recovery procedure is a beam alignment procedure that the UE acquires a second beam of a serving cell for data transmission.

18. The UE of claim 17, wherein further comprising: a beam selector, for selecting one or more best beams for the beam alignment procedure, wherein the one or more best beams are selected from the candidate beams.

19. The UE of claim 14, further comprising: the recovery module performs one or multiple recovery procedures, wherein the recovery detection procedure on the serving beam is performed first and then the beam alignment procedure is performed when radio link of the serving beam is not recovered.

20. The UE of claim 14, further comprising: the recovery module skips the recovery procedures when one or more skip conditions occur.

21. The UE of claim 14, wherein radio link failure is declared by the failure handler, when the recovery procedure fails and a radio resource control (RRC) connection reestablishment procedure is triggered.

* * * * *